United States Patent
Al Sayeed et al.

(10) Patent No.: US 9,985,726 B1
(45) Date of Patent: May 29, 2018

(54) SYSTEMS AND METHODS FOR A PREEMPTIVE CONTROLLER FOR PHOTONIC LINE SYSTEMS

(71) Applicant: Ciena Corporation, Hanover, MD (US)

(72) Inventors: Choudhury A. Al Sayeed, Gloucester (CA); Dave C. Bownass, Ottawa (CA); Scott Kohlert, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days. days.

(21) Appl. No.: 15/363,385

(22) Filed: Nov. 29, 2016

(51) Int. Cl.
*H04B 10/07* (2013.01)
*H04B 10/079* (2013.01)
*H04J 14/02* (2006.01)
*H04B 10/70* (2013.01)

(52) U.S. Cl.
CPC ......... *H04B 10/0791* (2013.01); *H04B 10/70* (2013.01); *H04J 14/021* (2013.01)

(58) Field of Classification Search
CPC .... H04B 10/0791; H04B 10/70; H04J 14/021
See application file for complete search history.

(56) References Cited

U.S. PATENT DOCUMENTS

| | | | |
|---|---|---|---|
| 5,442,544 A | 8/1995 | Jelinek | |
| 7,444,078 B1 | 10/2008 | Stango et al. | |
| 7,826,748 B2 | 11/2010 | Yang et al. | |
| 7,873,274 B2 | 1/2011 | Collings et al. | |
| 7,983,560 B2 | 7/2011 | Maki et al. | |
| 8,077,384 B2 * | 12/2011 | Mori | H04B 10/2935 359/334 |
| 8,095,008 B2 * | 1/2012 | Collings | H04J 14/0205 398/83 |
| 8,135,280 B2 | 3/2012 | Zong et al. | |
| 8,160,446 B2 | 4/2012 | Collings et al. | |
| 9,276,696 B2 | 3/2016 | Al Sayeed et al. | |
| 9,344,191 B2 | 5/2016 | Al Sayeed et al. | |
| 2003/0058497 A1 | 3/2003 | Park | |
| 2006/0018658 A1 | 1/2006 | Mori | |
| 2007/0269215 A1 | 11/2007 | Sugaya | |
| 2008/0285973 A1 | 11/2008 | Uchiyama et al. | |
| 2009/0116837 A1 | 5/2009 | Boertjes et al. | |
| 2010/0091355 A1 | 4/2010 | Ota | |
| 2010/0104276 A1 | 4/2010 | Komaki | |
| 2010/0202777 A1 | 8/2010 | Liu et al. | |

(Continued)

OTHER PUBLICATIONS

Aggarwal et al., A Self-Tuning Analog Proportional-Integral-Derivative (PI D) Controller, 2006, IEEE.
PID Theory Explained, Mar. 29, 2011, pp. 1-4.

*Primary Examiner* — Dzung Tran
(74) *Attorney, Agent, or Firm* — Clements Bernard Walker PLLC; Christopher L. Bernard; Lawrence A. Baratta, Jr.

(57) ABSTRACT

Systems and methods for an optical controller in an optical network for photonic control include monitoring signal output of the optical controller for fluctuations on a signal, wherein the optical controller may operate with one or more upstream optical controllers in the optical network which may cause the fluctuations; and initiating a control loop by the optical controller on the signal based on the monitored fluctuations. The initiating is based on one or more thresholds used to differentiate actions of the one or more upstream optical controllers of the plurality of optical controllers from one or more of fiber faults, natural fluctuations in fiber plant, and natural fluctuations in hardware.

18 Claims, 10 Drawing Sheets

(56) References Cited

U.S. PATENT DOCUMENTS

| | | |
|---|---|---|
| 2010/0221004 A1 | 9/2010 | Haslam et al. |
| 2011/0176802 A1 | 7/2011 | Callan |
| 2011/0200324 A1 | 8/2011 | Boertjes et al. |
| 2011/0222846 A1 | 9/2011 | Boertjes et al. |
| 2011/0222851 A1 | 9/2011 | Berg |
| 2011/0222862 A1 | 9/2011 | Boertjes et al. |
| 2011/0268442 A1 | 11/2011 | Boertjes et al. |
| 2011/0274425 A1 | 11/2011 | Grobe |
| 2016/0301845 A1* | 10/2016 | Bell .................... H04N 5/2328 |
| 2017/0168095 A1* | 6/2017 | Shinkle ................ G01R 17/02 |

* cited by examiner

SYSTEMS AND METHODS FOR A PREEMPTIVE CONTROLLER FOR PHOTONIC LINE SYSTEMS

FIELD OF THE DISCLOSURE

The present disclosure generally relates to optical networking systems and methods. More particularly, the present disclosure relates to systems and methods for a preemptive controller for photonic line systems.

BACKGROUND OF THE DISCLOSURE

In optical networks with Optical Add/Drop Multiplexers (OADMs) and interconnected mesh topologies, various photonic controllers operate concurrently, such as on a per optical section basis (OADM to adjacent OADM), to maintain spectral shape and to obtain a desired level of performance. Such controllers, categorized either as per channel or spectrum controllers, are analog controllers that work on an analog optical signal as input, use optical channel monitors located either at the start or at the end of an optical section to get necessary feedback, and generate an analog response, which is then used to make proportionate actuator changes to achieve a desired level of analog optical signal at the output. As described herein, a controller is a processing device, apparatus, service, etc. which is implementing a control loop. There can be multiple controllers operating concurrently throughout the optical network, and the technical challenge is maintaining stability since any adjustments can affect in-service traffic carrying channels. To address the concurrent operation, conventional approaches rely on messaging between controllers for coordination or sequential operation. The messaging approach is complex, especially for large mesh networks. The sequential operation is slow to converge and difficult to coordinate in large mesh networks. Other approaches have looked to avoid messaging while preserving parallel operation using damped responses in the associated control loops, the damped responses slow convergence allowing upstream controllers to converge first without coordination, although such method cannot stop ringing effect or amplifying the existing output fluctuations before achieving stability. The challenge for photonic line systems is how to manage the operation of a plurality of controllers operating control loops concurrently and maintaining stability avoiding the limitations of conventional approaches, namely complex messaging, which does not scale in large mesh networks, forced sequential operation which is difficult to coordinate, and damped responses that cannot minimize existing signal fluctuations at the controller output.

BRIEF SUMMARY OF THE DISCLOSURE

In an exemplary embodiment, a method implemented by an optical controller in an optical network for photonic control includes monitoring signal output of the optical controller for fluctuations on a signal, wherein the optical controller may operate with one or more upstream optical controllers in the optical network which may cause the fluctuations; and initiating a control loop by the optical controller on the signal based on the monitored fluctuations. The fluctuations can be based on one or more of fiber faults, natural fluctuations in fiber plant, natural fluctuations in hardware, and due to actions of the one or more upstream optical controllers. The initiating can be based on one or more thresholds used to differentiate actions of the one or more upstream optical controllers from one or more of fiber faults, natural fluctuations in fiber plant, and natural fluctuations in hardware. The monitoring is based on a plurality of thresholds which can include a Monitor Start Threshold (MST) used to start the monitoring, a Perturbation Acceptance Threshold (PAT) used to determine the initiating where the PAT is indicative of an ability to converge despite the fluctuations in the signal, and a Controller Convergence Threshold (CCT) used to declare convergence of the control loop. The CCT≤PAT and PAT≤MST. The CCT can be adjusted by the optical controller dynamically based on measurements when the fluctuations are less than or equal to the PAT but greater than the CCT.

The initiating can occur when the fluctuations are less than the PAT, and wherein the control loop is stopped when the fluctuations exceed the PAT. The optical controller and the one or more upstream optical controllers operate independently of one another without messaging for coordination. The method can further include, subsequent to the initiating, performing a subsequent monitoring of the fluctuations after a first control cycle of the control loop; and one of continuing the control loop based on the subsequent check and delaying the control loop based on the fluctuations in the subsequent monitoring. The subsequent monitoring can be performed for a random period of time determined by control cycles of the optical controller. The monitoring can detect an increase of the fluctuations over time, and the initiating can wait for a period of time while the fluctuations settle down.

In another exemplary embodiment, an optical controller adapted to perform photonic control in an optical network includes a processor; a communications interface communicatively coupled to the processor; and memory storing instructions that, when executed, cause the processor to monitor signal output of the optical controller for fluctuations on a signal, wherein the optical controller operates with one or more upstream optical controllers in the optical network which may cause the fluctuations, and initiate a control loop by the optical controller on the signal based on the monitored fluctuations. The fluctuations can be based on one or more of fiber faults, natural fluctuations in fiber plant, natural fluctuations in hardware, and due to actions of the one or more upstream optical controllers of the plurality of optical controllers. The control loop can be initiated based on one or more thresholds used to differentiate actions of the one or more upstream optical controllers from one or more of fiber faults, natural fluctuations in fiber plant, and natural fluctuations in hardware.

The signal output is monitored based on a plurality of thresholds which can include a Monitor Start Threshold (MST) used to start the monitor, a Perturbation Acceptance Threshold (PAT) used to initiate the control loop where the PAT is indicative of an ability to converge despite the fluctuations in the signal, and a Controller Convergence Threshold (CCT) used to declare convergence of the control loop. The CCT can be adjusted by the optical controller dynamically based on measurements when the fluctuations are less than or equal to the PAT but greater than the CCT. The control loop can be initiated when the fluctuations are less than the PAT, and wherein the control loop is stopped when the fluctuations exceed the PAT. The memory storing instructions that, when executed, can further cause the processor to, subsequent to the control loop being initiated, perform a subsequent monitor of the fluctuations after a first control cycle of the control loop, and one of continue the control loop based on the subsequent monitor and delay the control loop based on the fluctuations in the subsequent check.

In a further exemplary embodiment, an optical network includes a plurality of interconnected Optical Add/Drop Multiplexer (OADM) nodes; a plurality of links interconnecting the OADM nodes; and a plurality of optical controllers configured to perform photonic control, wherein each of the plurality of optical controllers are adapted to monitor signal output of an associated optical controller for fluctuations on a signal, and initiate a control loop by the associated optical controller on the signal based on the monitored fluctuations. The control loop can be initiated, at the associated optical controller, based on one or more thresholds used to differentiate actions of one or more upstream optical controllers of the plurality of optical controllers from one or more of fiber faults, natural fluctuations in fiber plant, and natural fluctuations in hardware.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Again, in various exemplary embodiments, the present disclosure relates to systems and methods for a preemptive controller for photonic line systems. The systems and methods utilize fluctuating conditions or perturbation amount on existing signals to determine whether to initiate control loops by a controller. Typical controllers act on the output first and make adjustments (e.g., attenuator adjustments, etc.) before realizing at some point that the controller is not converging for a certain duration. The typical controller then either continues an attempt at convergence or terminates at some point. In the systems and methods described herein, the proposed controller takes the signals' fluctuating conditions into account before initiating any control loops and hence adjustments (e.g., attenuator adjustments, etc.). Thus, the controller minimizes the occurrences of running control actions simultaneously, while other upstream controllers are potentially acting on the same set or a fractional set of input signals, without requiring coordination or messaging between the controllers. That is, the preemptive controllers described herein do not rely on explicit coordination between one another such as via messaging, do not require sequential operation, and do not dampen responses. The systems and methods define the decision points of the controllers' start of actions based on fluctuations and perturbations. Thus, the preemptive controllers can operate concurrently with other same layer controllers without requiring the aforementioned conventional approaches. It has been determined that using fluctuations and perturbations to determine whether to start a controller plays a significant role in maintaining stability in large mesh optical networks. Thus, the systems and methods achieve stability in the multiple controllers by defining specific start conditions based on monitored fluctuations and perturbations.

Exemplary Optical Network

Figure 1:
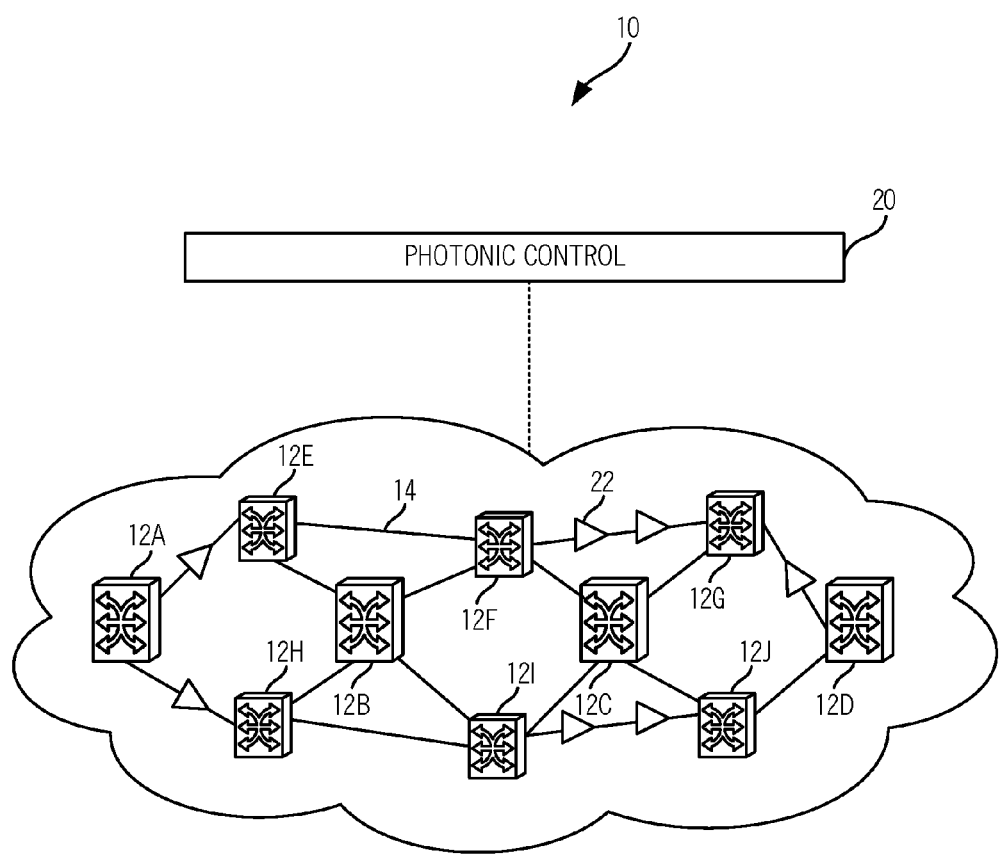
FIG. 1 is a network diagram of an exemplary optical network with interconnected OADM nodes.

Referring to FIG. 1, in an exemplary embodiment, a network diagram illustrates an exemplary optical network 10 with interconnected OADM nodes 12 (labeled as 12A-12J). Note, as described herein, the terms photonic network and optical network are synonymous and can refer to a Dense Wave Division Multiplexing (DWDM) network using fixed grid spectrum, flexible grid spectrum, etc. The OADM nodes 12 are interconnected by a plurality of links 14 and the OADM nodes 12 can include a Reconfigurable OADM or the like such as realized with Wavelength Selective Switches (WSSs) or the like. The OADM nodes 12 provide the photonic layer (e.g., Layer 0) and various functionality associated therewith (e.g., multiplexing, amplification, optical routing, wavelength conversion/regeneration, local add/drop, wavelength switching, etc.) including photonic control 20. The photonic layer and the photonic control 20 operating thereon can also include intermediate amplifiers 22 and/or regenerators (which are omitted for illustration purposes) on the links 14. The optical network 10 is illustrated, for example, as an interconnected mesh network, and those of ordinary skill in the art will recognize the network 10 can include other architectures, with OADM nodes 12 or with fewer OADM nodes 12, with additional amplifiers 22, with additional network elements and hardware, etc. Those of ordinary skill in the art will recognize the systems and methods described herein can be used in any optical networking scenario for the optical network 10, and the optical network 10 is merely presented for illustration purposes.

The OADM nodes 12 are connected with one another optically over the links 14. OADM nodes 12 can be network elements which include a plurality of ingress and egress ports forming the links 14. As described herein, a port may be formed by a transceiver module or optical modem to provide an optical connection between the OADM nodes 12. That is, in addition to the OADM nodes 12, there can be network elements with optical transceivers or modems included therein, such as switches, routers, terminals, etc. operating any upper layer protocols. The optical network 10 can include the photonic control 20 which can be viewed as a control algorithm/loop for managing wavelengths from a physical perspective at Layer 0. As described herein, sectional controllers, spectrum controllers, and per channel controllers are implemented in the photonic control 20. In one aspect, the photonic control 20 is configured to add/remove wavelengths from the links in a controlled manner to minimize impacts to existing, in-service, traffic-carrying channels. For example, the photonic control 20 can adjust modem launch powers, optical amplifier gain, variable optical attenuator (VOA) settings, WSS parameters, etc. The photonic control 20 can also be adapted to perform network optimization on the links 14. This optimization can also include re-optimization where appropriate.

Optical Sections

Figure 2:
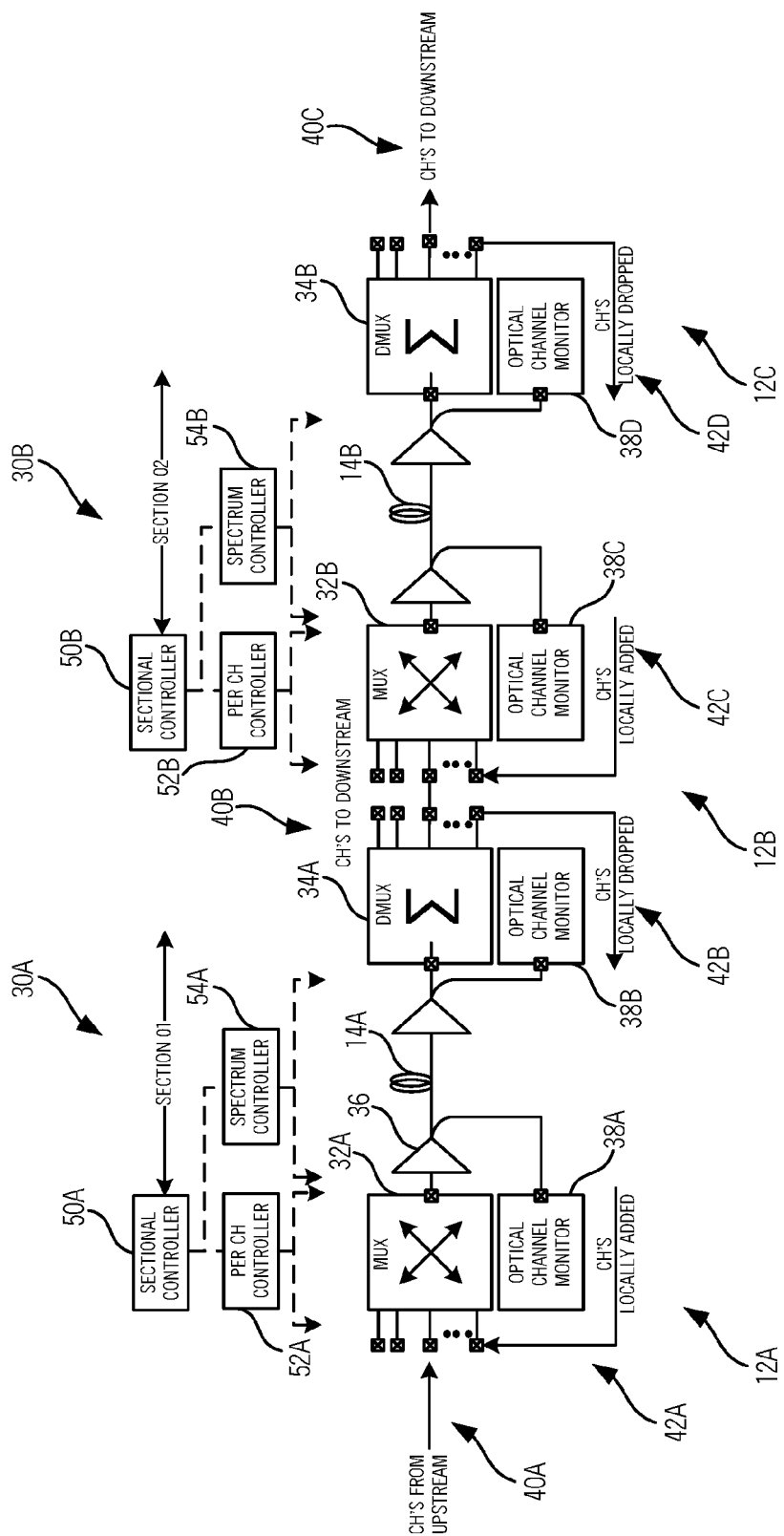
FIG. 2 is a network diagram of two exemplary optical sections in the optical network of FIG. 1 with associated controllers and photonic hardware.
Figure 3:
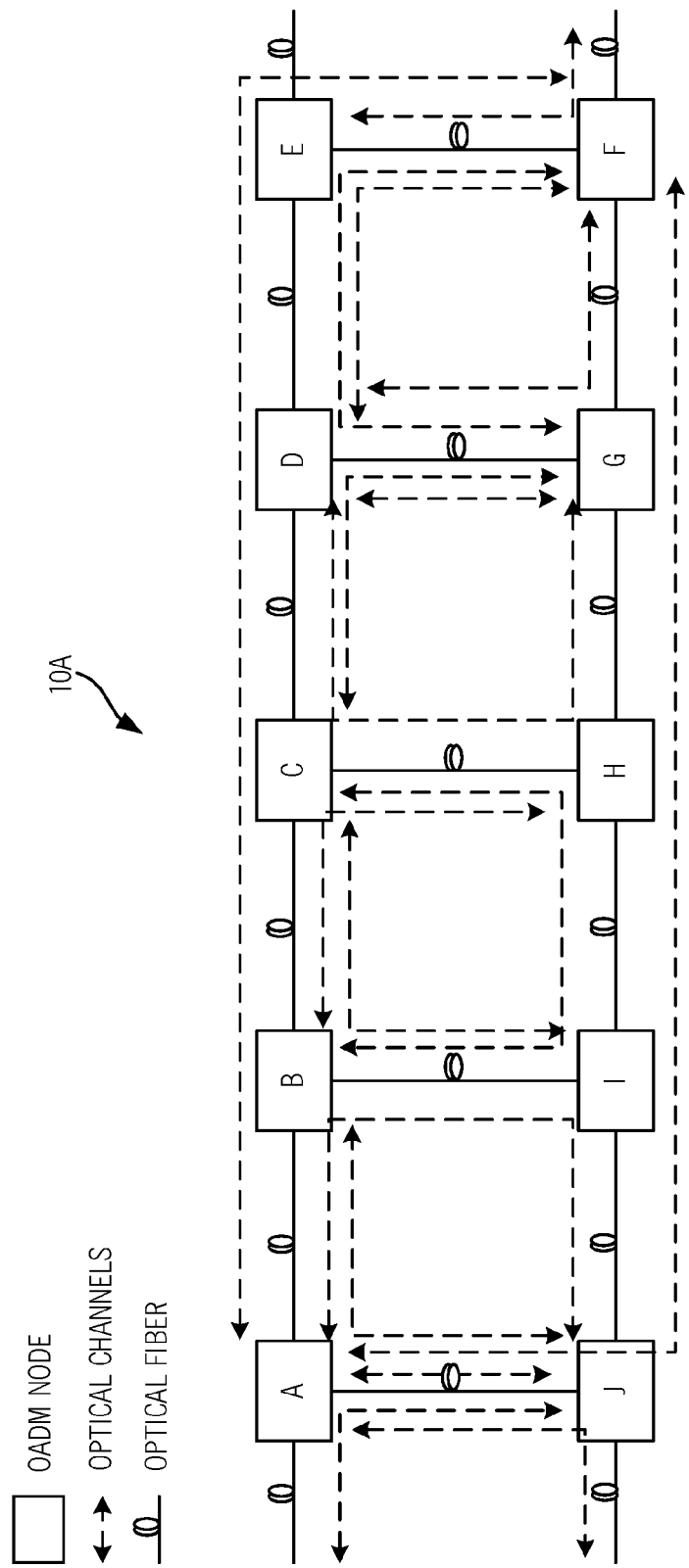
FIG. 3 is a network diagram of a mesh optical network with a plurality of OADM nodes.

Referring to FIG. 2, in an exemplary embodiment, a network diagram illustrates two exemplary optical sections 30 (labeled as 30A, 30B) in the optical network 10 with associated controllers and photonic hardware. As described herein, an optical section 30 is between two OADM nodes 12 which are channel access points for optical channels. Thus, each optical section 30 has the same number of channels at ingress and egress, i.e., typically in each optical section 30, spectral loading remains the same at a given time. In the example of FIG. 2, there are three OADM nodes 12A, 12B, 12C with the optical section 30A between the OADM nodes 12A, 12B and the optical section 30B between the OADM nodes 12B, 12C. FIG. 3 illustrates the optical sections 30A, 30B from a unidirectional perspective from the OADM node 12A to the OADM node 12B to the OADM node 12C, i.e., right to left for channel flow. Of course, the unidirectional perspective is for simplicity of illustration and actual deployments can include a second set of equipment for bidirectional communication.

The photonic hardware includes a multiplexer 32 (labeled as a multiplexer 32A at the OADM node 12A and a multiplexer 32B at the OADM node 12B), a demultiplexer 34 (labeled as a demultiplexer 34A at the OADM node 12B and a demultiplexer 34B at the OADM node 12C), optical amplifiers 36, and Optical Channel Monitors (OCM) 38 (labeled as OCMs 38A, 38B, 38C, 38D). The multiplexers 32 and the demultiplexers 34 can be WSSs or the like. The multiplexers 32 include a plurality of input ports and a common output port, and the multiplexers 32 have an ability to control optical power of individual channels as well as a composite signal on the common output port. The demultiplexers 34 includes a common input port and a plurality of output ports, and the demultiplexers 34 have an ability to control optical power of individual channels as well as a composite signal on the common input port.

For illustration purposes, optical links 14A, 14B between the OADM nodes 12A, 12B, 12C are shown only with pre and post amplifiers 36. Of course, there can be zero or more intermediate amplifiers 36 on the links 14A, 14B which are omitted for illustration purposes. The OCMs 38 are configured to receive a tap off an input or output to each OADM node 12 (note, the inputs and outputs to each OADM node 12 can be referred to as degrees). The OCMs 38 use the tap to determine per channel and overall power profiles of optical channels.

In operation, the multiplexer 32 receives channels 40A from upstream degrees as well as locally added channels 42A. The channels 40A, 42A are added together by the multiplexer 32A and provided to the OADM node 12B over the optical link 14A. The OADM node 12B receives the channels 40A, 42A, provides some channels 40B downstream to the OADM node 12C, some channels 42B for local drop, and some channels 42C for local add. The multiplexer 32B combines the channels 40B, 42C and provides them to the OADM node 12C over the optical link 14B. The demultiplexer 34B receives the channels 40B, 42C and provides some channels 40C to downstream degrees (not shown) and some channels 42D for local drop.

Again, the photonic control 20 is configured to implement various controllers over the optical sections 30A, 30B. The photonic control 20 can operate on a per section basis. Typically, in each optical section 30A, 30B, where the spectral loading at a given time remain unchanged, multiple controllers 50, 52, 54 can co-exist to control channel powers, signal to noise ratios (SNRs), and to maintain the spectrum shape to obtain a desired level of performance. Specifically, the controllers can include a sectional controller 50 (labeled as sectional controller 50A for the optical section 30A and as sectional controller 50B for the optical section 30B). The sectional controller 50 can include a per channel controller 52 (labeled as per channel controller 52A for the optical section 30A and as per channel controller 52B for the optical section 30B) and a spectrum controller 54 (labeled as spectrum controller 54A for the optical section 30A and as spectrum controller 54B for the optical section 30B). Such controllers 52, 54, categorized either as per channel controllers 52 or spectrum controllers 54, are analog controllers that work on an analog optical signal as input, use the OCMs 38 located either at the start or at the end of the optical section 30 to get necessary feedback, and generate an analog response, which is then used to make proportionate actuator changes, such as via the multiplexer 32, the demultiplexer 34, etc., to achieve a desired level of analog optical signal at the output. Note, while the controllers 50, 52, 54 are shown as separate, these can be the same devices and this separation is shown for logical functionality, namely the per channel controllers 52 operate on individual channels while the spectrum controllers 54 operate on the overall spectrum, i.e., all channels.

The controllers 50, 52, 54 can be implemented by a processing device, server, controller, etc. to receive input, perform optimization and provide an output related to the appropriate settings of the various components. The input can include optical spectrum at the start of the optical section 30, source ports of each signal in the optical spectrum, destination fiber degree of each signal in the optical spectrum, and signal characteristics of each signal. The signal characteristics can include, for example, control frequency or center frequency of the signal, the signal's spectral shape, required bandwidth or spectral spacing compared to neighboring signals, total signal power or power spectral density of the incoming signal at the source port, target launch power for each signal at the destination fiber span, each signal's modulation characteristics, and Signal-to-Noise Ratio (SNR) bias preferences compared to neighboring signals.

Mesh Optical Network

Referring to FIG. 3, in an exemplary embodiment, a network diagram illustrates a mesh optical network 10A with a plurality of OADM nodes 12 (labeled as A-J). A key assumption for typical photonic controllers 50, 52, 54 is that the input signal fed into the controller 50, 52, 54 is stable or has minimal breathing (i.e., very small fluctuations such as ≤0.4 dB peak-to-peak) that typically falls under most controllers' negligible error terms or dead zone. Again, conventionally, such stability on the input signal is typically ensured by establishing a messaging infrastructure among multiple photonic controllers so that, at any single time event, more than one controller does not act or makes active changes on the optical signal. Typically for linear networks, where controllers are linearly dependent with each other, such message-based framework can be scaled to maintain stability among controllers. However, when the number of dependent controllers, who will be acting on a common optical signal or a group of optical signals, are stretched in a mesh network environment or even in a long-haul linear network environment with meshed channel add/drops, such as in the optical network 10A, the message-based infrastructure cannot scale to maintain the sequence of events among the controllers.

In the mesh optical network 10A, a plurality of photonic controllers, each acting on a group of optical signals in a specific fiber direction, are optically dependent on each other, and when two and more controllers in such large setup act simultaneously, they create conflict between controllers and create unusual perturbations on the optical signals leading to instability. In such complex mesh optical networks 10A, which is typical in metro network deployments, establishing a message-based framework among controllers to sequence their action items is going to be difficult to achieve. In some network examples, instead of peer-to-peer messaging, it is also possible to establish a centralized controller to act as a master to control the sequence of action events among all photonic controllers. Since in such centralized control setup, each individual photonic controller cannot take its own decisions in terms of control loop initiations, the overall performance recovery of a network following a fiber fault or capacity change could be very slow. In addition, if any of the photonic controllers loses communication with the centralized master, the network cannot recover autonomously out of fault.

Figure 4:
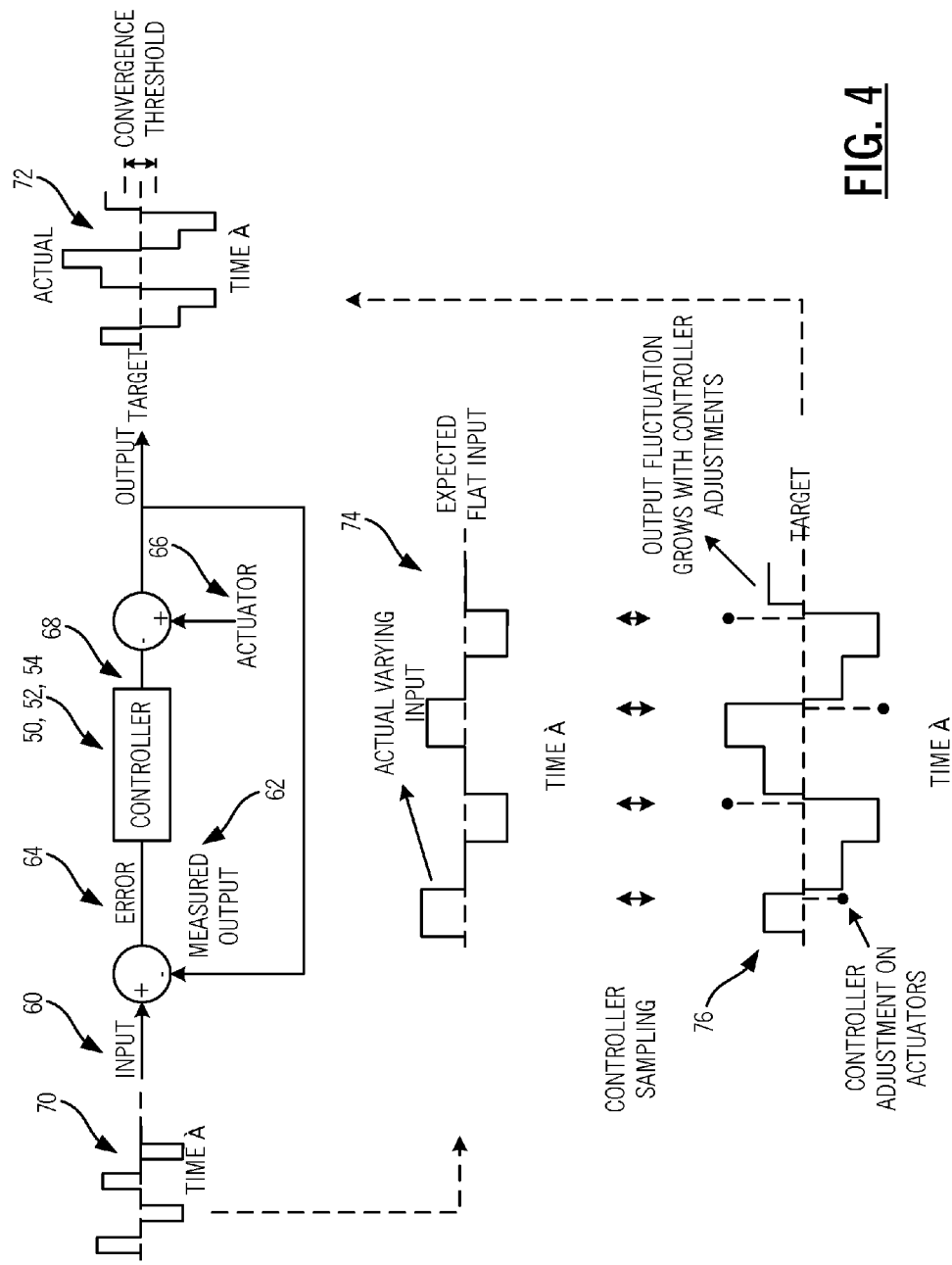
FIG. 4 is a block diagram and graphs of responses of optical controllers when acting on already fluctuating input signals without knowing the status of upstream dependent controllers.

Referring to FIG. 4, in an exemplary embodiment, a block diagram and graphs illustrate responses of optical controllers 50, 52, 54 when acting on already fluctuating input signals without knowing the status of upstream dependent controllers. In operation, the controller 50, 52, 54 receives an input 60 which is combined with a measured output 62 to form an error signal 64. The controller 50, 52, 54 performs a control loop which can result in actuator 66 adjustments which are combined with an output 68 of the controller 50, 52, 54 to provide the measured output 62. Fluctuations 70 on the input signals 60 can either come from fiber faults, from natural fluctuations in fiber plant (e.g., Polarization Dependent Loss (PDL)) or hardware (e.g., dither), or simply due to actions of one or more upstream controllers 50, 52, 54. As the example illustrates, depending on the fluctuation 70 amount and frequency of the input signal 60, the controller 50, 52, 54 can make wrong decisions on actuator adjustments that in turn, widens the fluctuation amount (shown on output signal 72). When a downstream controller 50, 52, 54 further reacts, it amplifies the fluctuation even more (shown in graphs 74, 76), ultimately leading to instability in the network.

Preemptive Controllers

As described herein, stability between multiple photonic controllers 50, 52, 54 running in mesh optical networks 10, 10A is a long-standing issue. In a large mesh optical network 10, 10A, where optical channels add/drop over a short distance between the OADM nodes 12, there are complex optical dependencies among the controllers 50, 52, 54. In these highly meshed optical networks 10, 10A, maintaining a message-based solution often creates deadlock conditions. Using a timer-based solution, where at some point, multiple controllers wake up at the same time and make actuator changes at different parts of the network, can also lead to the large ringing of optical signals.

To ensure stability in the mesh optical networks 10, 10A, while maintaining the scalability of adapting the controllers 50, 52, 54, a preemptive controller is proposed that can be adapted both for per channel controllers 52 or for spectrum controllers 54 in the mesh optical networks 10, 10A. The key concept of the preemptive controller is to take the existing optical signals' perturbation into account at the output, i.e., at the feedback monitoring point such as via the OCM 38 before even initiating its own control loops. The preemptive controller decides whether to initiate the control loop in the current fluctuating state at the output and, if initiated, whether to adapt the controller convergence threshold criteria dynamically to match the existing fluctuating condition.

Figure 5:
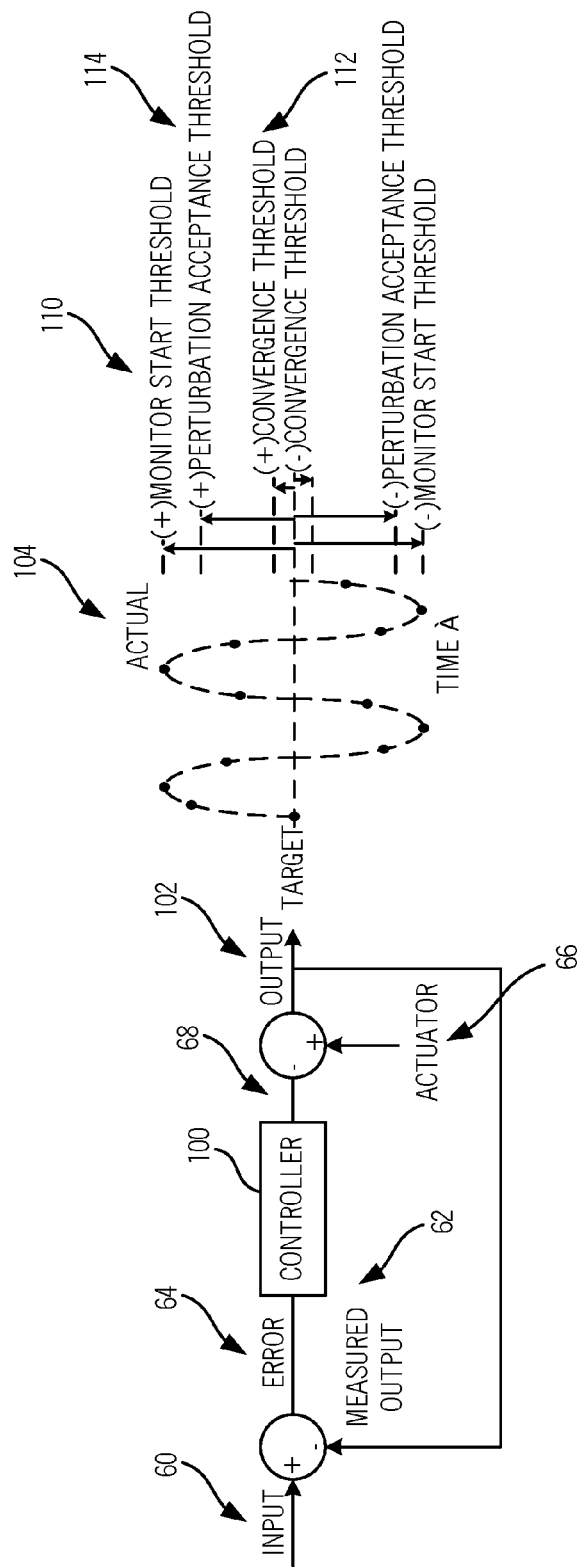
FIG. 5 is a block diagram and graph of a preemptive controller which can be used for the optical controllers.

Referring to FIG. 5, in an exemplary embodiment, a block diagram and graph illustrate a preemptive controller 100 which can be used for the controllers 50, 52, 54. The preemptive controller 100, similar to FIG. 4, has the input 60 combined with the measured output 62 to provide the error signal 64 to the preemptive controller 100 which implements a control loop providing the output 68 which is combined with the actuator 66 and associated adjustments thereon based on the control loop. The output 102 is the same as the measured output 62 and an example graph 104 illustrates the output 102.

The primary objective of the proposed preemptive controller 100 is to initiate control loop actions only when it is ensured to be safe without disrupting the stability of the optical networks 10, 10A. The preemptive controller 100 works based on three key thresholds 110, 112, 114 which are monitored on the output signal 102, such as based on the OCM 38. Note, with the preemptive controller 100 inoperable, the output signal 102 is substantially the same as the input 60. The three key thresholds 110, 112, 114 are used to decide if fluctuations exist on the signals at the point of control, whether to initiate the control loop in its current monitoring state and if initiated, whether to adapt the convergence threshold criteria dynamically to match the existing fluctuating condition. The three key threshold points 110, 112, 114 are Monitor Start Threshold (MST) 110, Controller Convergence Threshold (CCT) 112, and Perturbation Acceptance Threshold (PAT) 114.

The MST 110 is the threshold level at which point if the measured error 64, which is the delta between measured output 62 and a target at any point in time becomes higher than the given level, the preemptive controller 100 wakes up and starts monitoring the output signal 102. The CCT 112 is the threshold that the preemptive controller 100 uses to declare convergence or exit control loops if the measured error 64 at any given time or for a duration of time falls within this defined threshold. The PAT 114 is the threshold where the preemptive controller 100 determines it can converge successfully even if the input signal 60 is fluctuating within that threshold. All these three threshold values 110, 112, 114 can be different from controller to controller based on the configuration where the preemptive controller 100 is running and the corresponding signal(s) and target(s). The threshold values 110, 112, 114 can be bounded between a positive and negative value with a check indicative of the output signal 102 being with the bound.

Both the MST 110 and the PAT 114 values can be set during the design phase of the preemptive controller 100, while the CCT 112 value can be adjusted by the preemptive controller 100 dynamically based on real-time measurements of signals. There can be a validity check on the preemptive controller 100 that always ensures that, CCT 112≤PAT 114 and PAT 114≤MST 110. Before starting the control on a signal, the output signal 102 is monitored at the output monitoring point at a sample rate≥controller iteration cycle and for a duration≥controller iteration cycle.

If the output 102 is fluctuating by an amount greater than the CCT 112, but less than or equal to the PAT 114, the CCT 112 can be moved to match the (average fluctuation amount+ε), where ε is small error offset to overcome the measurement and actuator setting errors. If the output signal 102 fluctuation is greater than the PAT 114, then the preemptive controller 100 freezes (does not make any actuator adjustments), and keeps monitoring the output 102 until fluctuation becomes lower than or equal to the PAT 114.

The preemptive controller 100 can be the per channel controller 52 where controller monitors power or Optical Signal to Noise Ratio (OSNR) at its output monitoring point. The preemptive controller 100 can be the spectrum controller 54 as well, where the controller monitors power or OSNR of the plurality of channels at its output monitoring point.

Figure 6A:
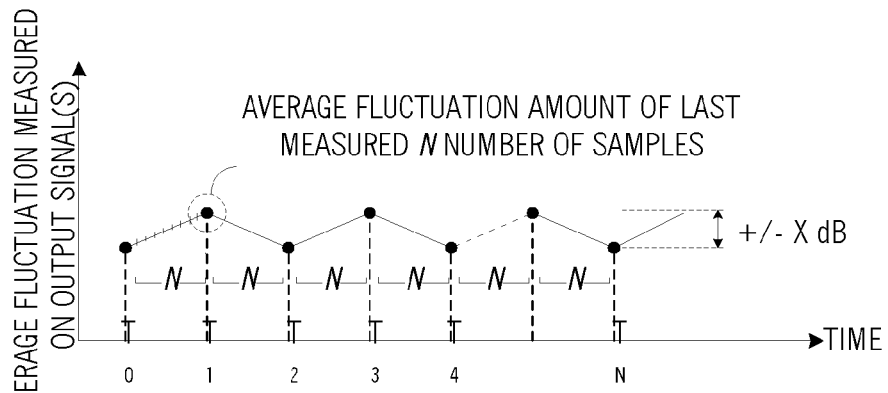
FIGS. 6(A), 6(B), and 6(C) are graphs of average fluctuations measured on output signals over time.
Figure 6B:
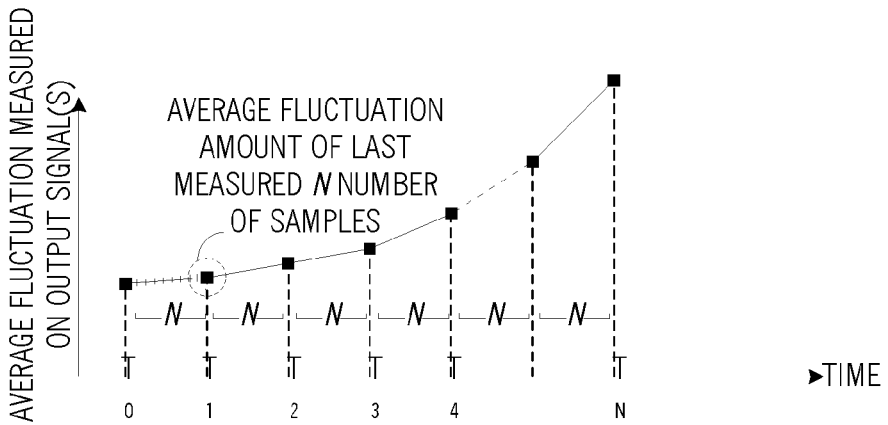
Figure 6C:
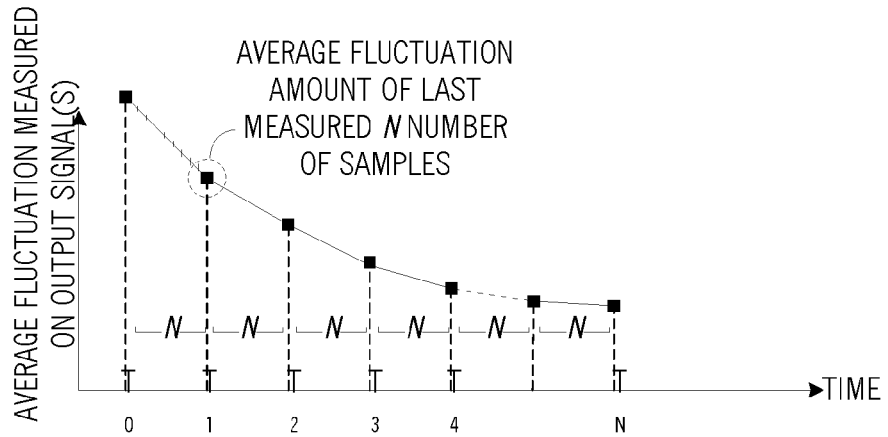

Further, the preemptive controller 100, before initiating the control loops, tracks the rate of change of the average amount of fluctuations in the output signal(s) 102 over time that helps to differentiate fluctuations due to natural causalities versus interactions due to upstream controllers. This also helps the preemptive controller 100 to decide when and where to re-adjust the convergence threshold before initiating the control loops. Referring to FIGS. 6(A), 6(B), and 6(C), in exemplary embodiments, graphs illustrate average fluctuations measured on output signals 102 over time. As shown in FIG. 6(A), the preemptive controller 100 takes samples of output signal values over certain durations, where a delta between output signal values (power or OSNR) collected over n number of samples are further averaged to get an average fluctuation amount at any given time $t_n$. If the average fluctuation amount measured over certain duration remain within +/−X dB of each other, where X is small finite number (e.g., X≤0.4 dB), the preemptive controller 100 considers that condition as a "natural state", at which point, the convergence threshold is re-adjusted to match (average fluctuation+X/2+ε), where ε is a small error offset to overcome the measurement and actuator setting errors (e.g., ε≤0.1 dB).

However, as shown in FIG. 6(B), if the average fluctuation amount grows up over a certain amount of time, the preemptive controller 100 considers the fluctuation is coming due to interactions of upstream controllers. At this point, the preemptive controller 100 does not re-adjust the CCT 112 and does not initiate control loops, even if the average fluctuation amount is less than the PAT 114. Similarly, as shown in FIG. 6(C), if the average fluctuation amount is reduced over time, the preemptive controller 100 considers the state as settling down for upstream controllers. The preemptive controller 100 does not re-adjust the CCT 112 and does not initiate control loops in this state, even if the average fluctuation amount is less than the PAT 114. In both cases, the CCT 112 is re-adjusted only when the measured average fluctuation amount reaches the "natural state."

If analog optical signals are perturbing beyond the CCT 112, a typical controller will make things worse when applying the control on top of already perturbed signals. The key objective of the preemptive controller 100 is to maintain the stability of the optical network 10, 10A while achieving the objective of per channel power or OSNR target or maintaining power or OSNR equalization over the spectrum at targeted points in an optical section 30. There are some controllers that initiate their control loops simultaneously and independently without any messaging from upstream controllers, and take the input power variations into account to adapt the control loop parameters at least after running one or more iterations to make active changes to actuators. Compared to that, the preemptive controller 100 is designed to take the existing signals' perturbation into account at the output or feedback monitoring point before even starting its own control loops and decide even whether to initiate to control loop in the current state, and if initiated, whether to adapt the convergence threshold criteria dynamically to match the existing fluctuating condition.

Also, the preemptive controller 100 works independently without any messaging to coordinate actions between upstream or downstream controllers, making the preemptive controller 100 perfectly scalable for large linear or mesh networks 10, 10A. By monitoring the signals in its own control loop and feedback mechanism ahead of time, the preemptive controller 100 minimizes any occurrences of running control actions simultaneously while other upstream controllers are potentially acting on the same set or a fractional set of input signals. In this way, the fluctuation on the optical signals does not get amplified when traversing through a single or plurality of controllers over the optical network 10, 10A—all of which can potentially react on the same optical signal input without any messaging or external coordination between them.

Figure 7:
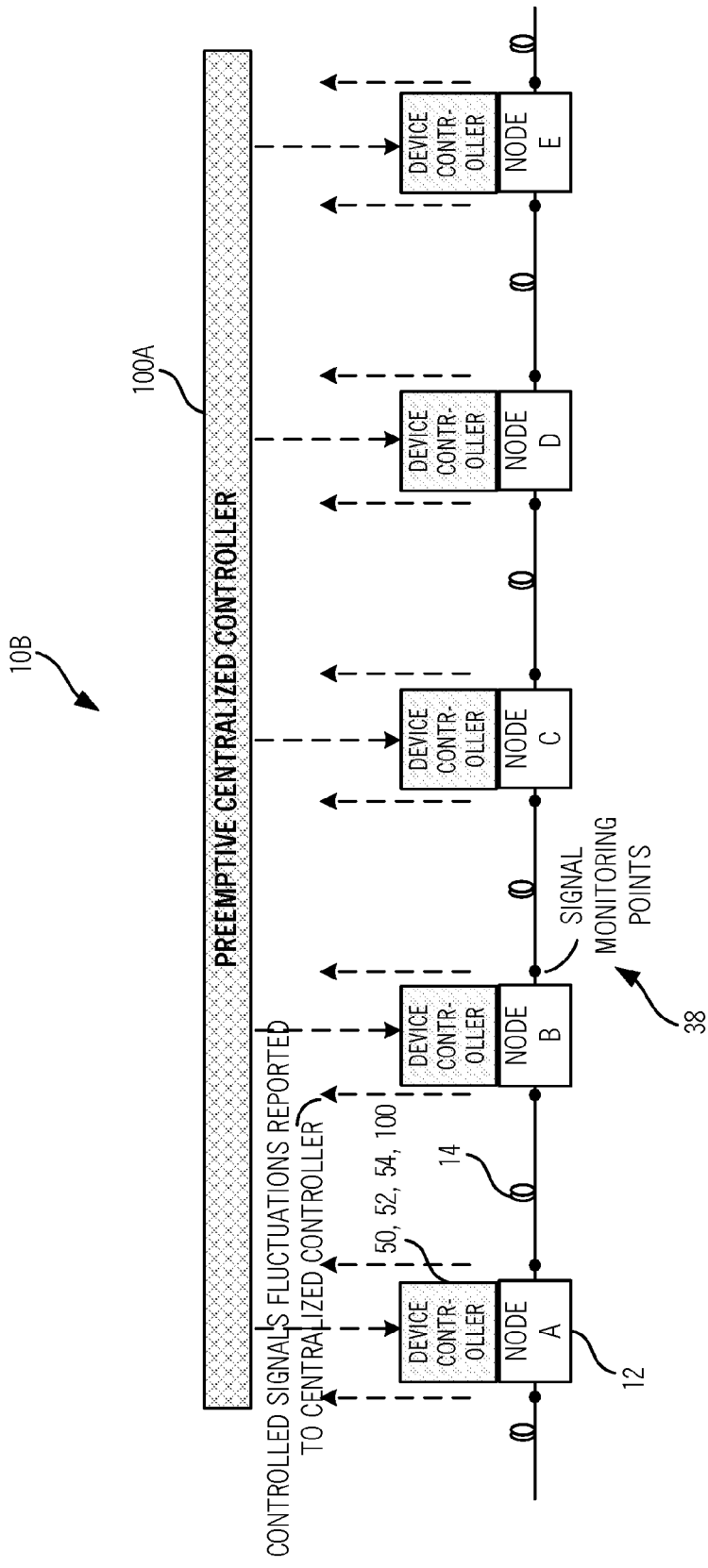
FIG. 7 is a network diagram of an optical network with a network-wide centralized preemptive controller.

Referring to FIG. 7, in an exemplary embodiment, a network diagram illustrates an optical network 10B with a network-wide centralized preemptive controller 100A. Here, the preemptive controller 100 can monitor controlled signals' fluctuations at a plurality of monitoring points (for example, at the start and at the end of each OADM section, via the OCMs 38), and based on the fluctuation amount, either preempt local node level or device controllers 50, 52, 54, 100 not to initiate their control loop actions, or start their control loops with re-adjusted CCT 112 so that the overall signal fluctuation amount originated primarily due to natural causalities does not grow up with controller initiated actions.

Dependencies Amongst Preemptive Controllers

Figure 8:
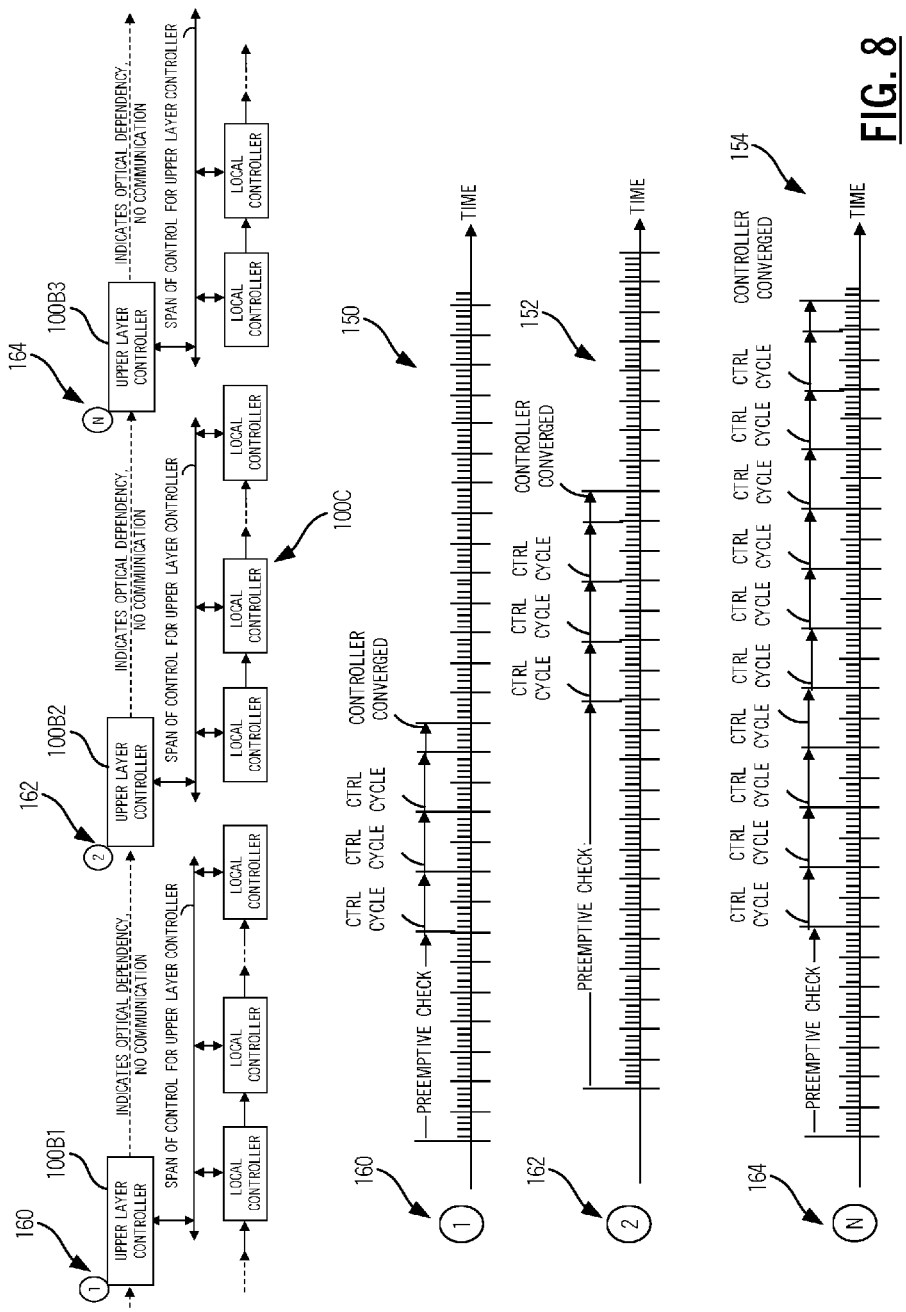
FIGS. 8 and 9 are a block diagram and graphs of dependencies amongst an upper layer preemptive controllers with associated local preemptive controllers under a span of control of an associated upper layer preemptive controller.
Figure 9:
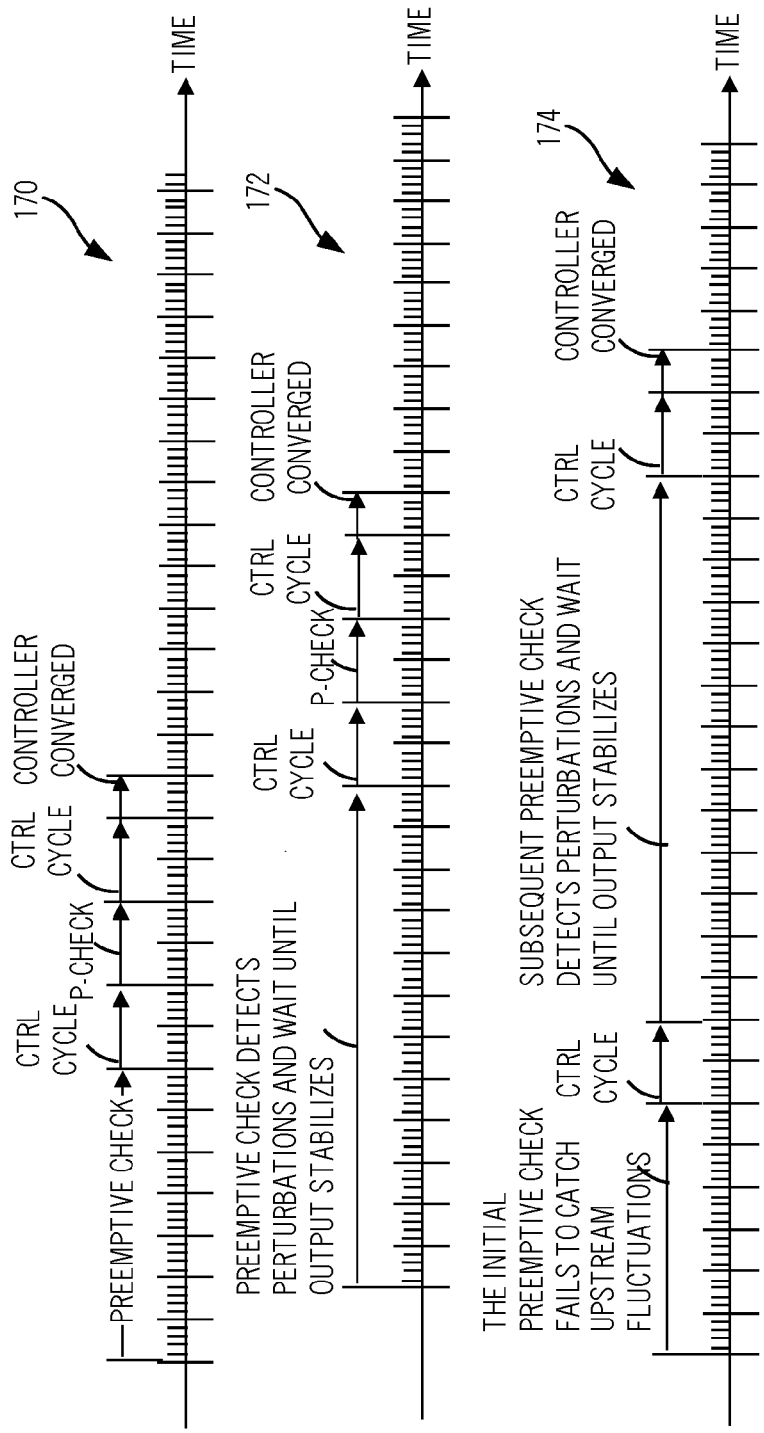

Referring to FIGS. 8 and 9, in an exemplary embodiment, a block diagram and graphs illustrate dependencies amongst an upper layer preemptive controllers 100B (labeled as 100B1, 100B2, 100B3) with associated local preemptive controllers 100C under a span of control by an associated upper layer preemptive controller 100B. The upper layer controllers 100B have optical dependencies between one another, i.e., control of optical signals by one upper layer controller 100B has an effect on other upper layer controllers 100B, but there is no communication between the upper layer controllers 100B. In an exemplary embodiment, every upper layer preemptive controller 100B runs monitoring and controller cycles on their own clocks/ticks that reduce the probability of sync up between multiple optically dependent controllers.

Graphs 150, 152, 154 illustrate a control cycle for the upper layer preemptive controllers 100B1, 100B2, 100B3, respectively. At a point 160, the upper layer preemptive controller 100B1 detects the error at the controller output is large enough to trigger controller cycles, in the graph 150. At a point 162, the upper layer preemptive controller 100B2 monitor detects the error at the controller output is large enough to trigger controller cycles, in the graph 152. At a point 164, the upper layer preemptive controller 100B3 monitor detects the error at the controller output is large enough to trigger controller cycles, in the graph 154.

As seen in the graphs 150, 152, 154, over N number of controllers, it is possible that two or more optically dependent controllers' monitoring cycle sync up allowing downstream controller(s) to initiate control loop regardless of the initial preemptive check. The $N^{th}$ controller may take a longer time to settle down due to perturbations coming from upstream controllers, and can generate some ringing effect on channel powers.

To avoid this issue in the graph 154, each upper layer preemptive controller 100B can run a preemptive check before initiating the control cycle for a random period of time limited by a minimum of two regular controller cycle time to a maximum of m number of controller cycle time, where m>2. Adding this extra randomness in preemptive check time reduces further sync-up probabilities between upper layer preemptive controllers 100B.

If for an upper layer controller 100B, all channels are originated from local add access points, then the duration of the preemptive check be reduced as in this case, the upper layer controller 100B only needs to check perturbations generated from local controllers 100C within its span of control. This is also one reason why, for a preemptive check, each controller has to check its own output point for stability in errors instead of checking solely at inputs (since checking inputs does not catch issues with perturbations coming from local controllers 100C).

In addition, each controller 100B can run at least one additional preemptive check after the first control cycle (i.e. following a control loop and actuator settling time) that helps to detect perturbations coming either from upstream controllers or from stabilization of local controllers. In this way, even if a downstream controller starts a control cycle before the initiation of an upstream one, the downstream controller gets a chance to detect the perturbations in the next preemptive check. Also, to ensure network-wide stability, in each control cycle, every controller can only compensate for a small percentage change in the total error accumulated on that cycle or iteration.

The primary objective of a preemptive check for controllers 100 is to make sure two or more optically dependent controllers 100 do not overlap their control actions at the same time. Here, maintaining the networkwide stability among controllers 100 (i.e., minimizing the probability of controller to controller chain reaction or ringing effect) is the primary concern and overall convergence time for an individual controller 100 are not the priority. The proposed preemptive check helps controllers to detect perturbations on the output and avoid running a control loop to ensure stability as the first priority. On the second order, controller 100 may decide to run a control loop on condition that the fluctuations are within tolerable range and it can still maintain existing stability without causing any further amplification of the existing fluctuations in errors. In addition, the random duration for the preemptive check, running each controller on their own clock, and doing extra preemptive check after a first control cycle helps to avoid synchronization or lock-up between two or more optical dependent controllers.

FIG. 9 illustrates graphs 170, 172, 174, corresponding to the graphs 150, 152, 154, with the implementation of the preemptive check. In the graphs 170, 172, 174, the upper layer controller 100B1, 100B2, 100B3 monitors detect the error at the controller output is large enough to trigger controller cycles. Each controller runs a preemptive check at the start for a random period of time limited by a minimum of two regular controller cycle time to a maximum of m number of controller cycle time, where m>2, adding this extra randomness in preemptive check time reduces further sync-up probability between controllers. In addition, each controller does an extra preemptive check after a first control cycle that helps to detect perturbations coming either from upstream controllers or from stabilization of local controllers.

Exemplary Controller

Figure 10:
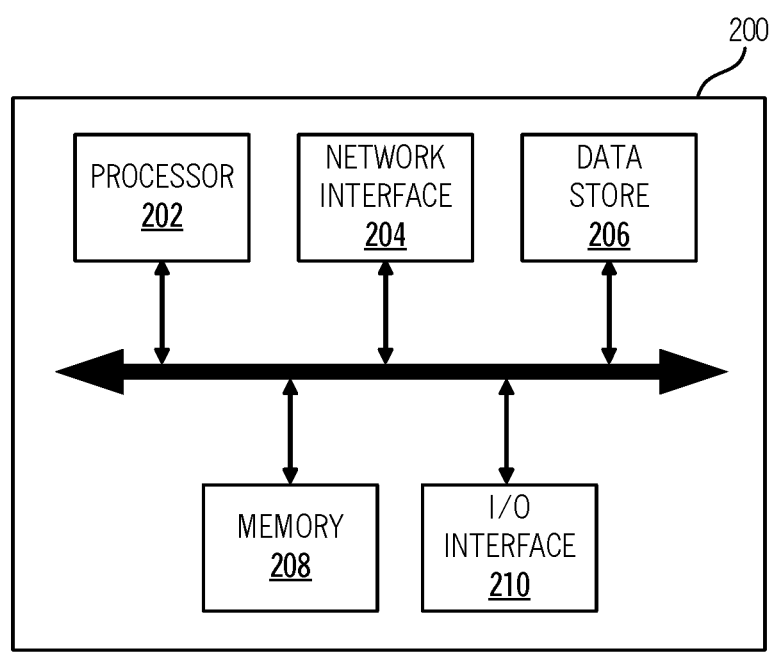
FIG. 10 is a block diagram of a processing device to implement the various controllers described herein.

Referring to FIG. 10, in an exemplary embodiment, a block diagram illustrates a processing device 200 to implement the controllers 50, 52, 54, 100. The processing device 200 can be part of common equipment at a network element, such as the OADM 12, or a stand-alone device communicatively coupled to the network element. The processing device 200 can include a processor 202 which is a hardware device for executing software instructions such as operating the control plane. The processor 202 can be any custom made or commercially available processor, a central processing unit (CPU), an auxiliary processor among several processors associated with the processing device 200, a semiconductor-based microprocessor (in the form of a microchip or chip set), or generally any device for executing software instructions. When the processing device 200 is in operation, the processor 202 is configured to execute software stored within the memory, to communicate data to and from the memory, and to processing device control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate, such as to communicate to the network elements, OCMs 38, etc., to a management system, and the like. The network interface 204 can include address, control, and/or data connections to enable appropriate communications on the network. The data store 206 can be used to store data, such as control plane information, provisioning data, OAM&P data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

In an exemplary embodiment, the processing device 200 is an optical controller adapted to perform photonic control in an optical network. The optical controller includes a processor; a communications interface communicatively coupled to the processor; and memory storing instructions that, when executed, cause the processor to monitor signal output of the optical controller for fluctuations on a signal, wherein the optical controller operates with one or more upstream optical controllers in the optical network which may cause the fluctuations, and initiate a control loop by the optical controller on the signal based on the monitored fluctuations. The fluctuations can be based on one or more of fiber faults, natural fluctuations in fiber plant, natural fluctuations in hardware, and due to actions of the one or more upstream optical controllers of the plurality of optical controllers. The control loop can be initiated based on one or more thresholds used to differentiate actions of the one or more upstream optical controllers of the plurality of optical controllers from one or more of fiber faults, natural fluctuations in fiber plant, and natural fluctuations in hardware.

The signal output is monitored based on a plurality of thresholds including a Monitor Start Threshold (MST) used to start the monitor, a Perturbation Acceptance Threshold (PAT) used to initiate the control loop where the PAT is indicative of an ability to converge despite the fluctuations in the signal, and a Controller Convergence Threshold (CCT) used to declare convergence of the control loop. In an exemplary embodiment, CCT≤PAT and PAT≤MST. The CCT can be adjusted by the optical controller dynamically based on measurements when the fluctuations are less than or equal to the PAT but greater than the CCT.

The control loop can be initiated when the fluctuations are less than the PAT, and wherein the control loop is stopped when the fluctuations exceed the PAT. The optical controller and the plurality of optical controllers operate independently of one another without messaging for coordination. The memory storing instructions that, when executed, can further cause the processor to, subsequent to the control loop being initiated, perform a subsequent monitoring of the fluctuations after a first control cycle of the control loop, and one of continue the control loop based on the subsequent monitoring and delay the control loop based on the fluctuations in the subsequent monitoring.

In another exemplary embodiment, an optical network includes a plurality of interconnected Optical Add/Drop Multiplexer (OADM) nodes; a plurality of links interconnecting the OADM nodes; and a plurality of optical controllers configured to perform photonic control, wherein each of the plurality of optical controllers are adapted to monitor signal output of an associated optical controller for fluctuations on a signal, and initiate a control loop by the associated optical controller on the signal based on the monitored fluctuations. The control loop is initiated, at the associated optical controller, based on one or more thresholds used to differentiate actions of one or more upstream optical controllers of the plurality of optical controllers from one or more of fiber faults, natural fluctuations in fiber plant, and natural fluctuations in hardware.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented by an optical controller in an optical network for photonic control, the method comprising:
    monitoring signal output of the optical controller for fluctuations on a signal, wherein the optical controller may operate with one or more upstream optical controllers in the optical network which may cause the fluctuations; and
    initiating a control loop by the optical controller on the signal based on the monitored fluctuations,
    wherein the monitoring and the initiating are based on a plurality of thresholds comprising
        a Monitor Start Threshold (MST) used to start the monitoring,
        a Perturbation Acceptance Threshold (PAT) used to determine the initiating where the PAT is indicative of an ability to converge despite the fluctuations in the signal, and
        a Controller Convergence Threshold (CCT) used to declare convergence of the control loop.

2. The method of claim 1, wherein the fluctuations are based on one or more of fiber faults, natural fluctuations in fiber plant, natural fluctuations in hardware, and due to actions of the one or more upstream optical controllers.

3. The method of claim 1, wherein the initiating is based on one or more thresholds used to differentiate actions of the one or more upstream optical controllers from one or more of fiber faults, natural fluctuations in fiber plant, and natural fluctuations in hardware.

4. The method of claim 1, wherein CCT≤PAT and PAT≤MST.

5. The method of claim 1, wherein the CCT is adjusted by the optical controller dynamically based on measurements when the fluctuations are less than or equal to the PAT but greater than the CCT.

6. The method of claim 1, wherein the initiating occurs when the fluctuations are less than the PAT, and wherein the control loop is stopped when the fluctuations exceed the PAT.

7. The method of claim 1, wherein the optical controller and the one or more upstream optical controllers operate independently of one another without messaging for coordination.

8. The method of claim 1, further comprising:
subsequent to the initiating, performing a subsequent monitoring of the fluctuations after a first control cycle of the control loop; and
one of continuing the control loop based on the subsequent check and delaying the control loop based on the fluctuations in the subsequent monitoring.

9. The method of claim 8, wherein the subsequent monitoring is performed for a random period of time determined by control cycles of the optical controller.

10. The method of claim 1, wherein the monitoring detects an increase of the fluctuations over time, and the initiating waits for a period of time while the fluctuations settle down.

11. An optical controller adapted to perform photonic control in an optical network, the optical controller comprising:
a processor;
a communications interface communicatively coupled to the processor; and
memory storing instructions that, when executed, cause the processor to
monitor signal output of the optical controller for fluctuations on a signal, wherein the optical controller operates with one or more upstream optical controllers in the optical network which may cause the fluctuations, and
initiate a control loop by the optical controller on the signal based on the monitored fluctuations,
wherein the signal output is monitored and the control loop is initiated based on a plurality of thresholds comprising
a Monitor Start Threshold (MST) used to start the monitor,
a Perturbation Acceptance Threshold (PAT) used to initiate the control loop where the PAT is indicative of an ability to converge despite the fluctuations in the signal, and
a Controller Convergence Threshold (CCT) used to declare convergence of the control loop.

12. The optical controller of claim 11, wherein the fluctuations are based on one or more of fiber faults, natural fluctuations in fiber plant, natural fluctuations in hardware, and due to actions of the one or more upstream optical controllers of the plurality of optical controllers.

13. The optical controller of claim 11, wherein the control loop is initiated based on one or more thresholds used to differentiate actions of the one or more upstream optical controllers from one or more of fiber faults, natural fluctuations in fiber plant, and natural fluctuations in hardware.

14. The optical controller of claim 11, wherein the CCT is adjusted by the optical controller dynamically based on measurements when the fluctuations are less than or equal to the PAT but greater than the CCT.

15. The optical controller of claim 11, wherein the control loop is initiated when the fluctuations are less than the PAT, and wherein the control loop is stopped when the fluctuations exceed the PAT.

16. The optical controller of claim 11, wherein the memory storing instructions that, when executed, further cause the processor to
subsequent to the control loop being initiated, perform a subsequent monitor of the fluctuations after a first control cycle of the control loop, and
one of continue the control loop based on the subsequent monitor and delay the control loop based on the fluctuations in the subsequent check.

17. An optical network, comprising:
a plurality of interconnected Optical Add/Drop Multiplexer (OADM) nodes;
a plurality of links interconnecting the OADM nodes; and
a plurality of optical controllers configured to perform photonic control, wherein each of the plurality of optical controllers are adapted to
monitor signal output of an associated optical controller for fluctuations on a signal, and
initiate a control loop by the associated optical controller on the signal based on the monitored fluctuations,
wherein the signal output is monitored and the control loop is initiated based on a plurality of thresholds comprising
a Monitor Start Threshold (MST) used to start the monitor,
a Perturbation Acceptance Threshold (PAT) used to initiate the control loop where the PAT is indicative of an ability to converge despite the fluctuations in the signal, and
a Controller Convergence Threshold (CCT) used to declare convergence of the control loop.

18. The optical network of claim 17, wherein the control loop is initiated, at the associated optical controller, based on one or more thresholds used to differentiate actions of one or more upstream optical controllers of the plurality of optical controllers from one or more of fiber faults, natural fluctuations in fiber plant, and natural fluctuations in hardware.

* * * * *